March 30, 1926.
A. W. FARWELL
1,578,884
GAUGE FOR MOLDING KNIVES
Filed Jan. 27, 1925
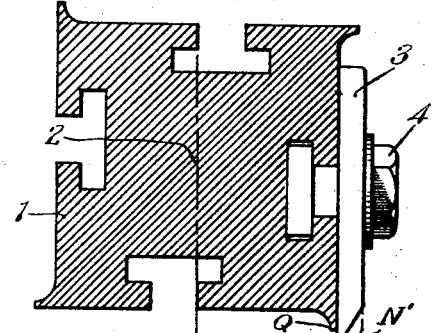
Fig. 1.
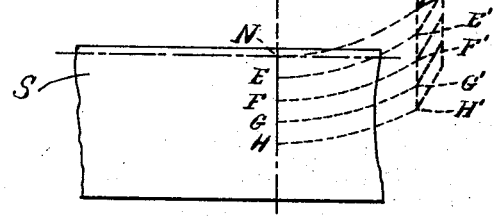
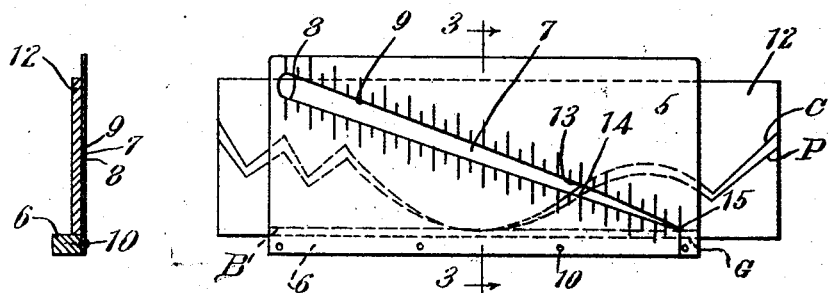
Fig. 3.    Fig. 2.
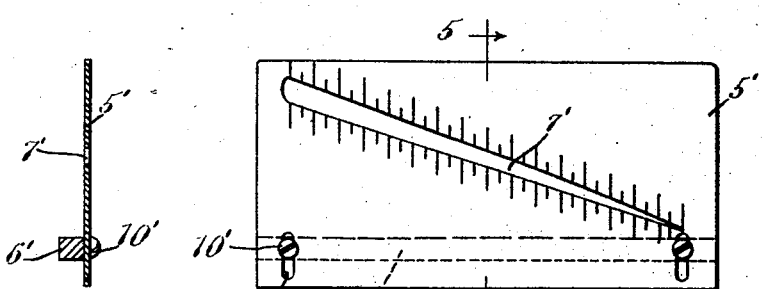
Fig. 5.    Fig. 4.
Inventor:
Albert W. Farwell
by Roberts, Roberts & Cushman
Att'ys.

Patented Mar. 30, 1926.

1,578,884

UNITED STATES PATENT OFFICE.

ALBERT W. FARWELL, OF STERLING, MASSACHUSETTS, ASSIGNOR TO SIMONDS SAW AND STEEL COMPANY, OF FITCHBURG, MASSACHUSETTS, A CORPORATION OF MASSACHUSETTS.

GAUGE FOR MOLDING KNIVES.

Application filed January 27, 1925. Serial No. 5,058.

*To all whom it may concern:*

Be it known that I, ALBERT W. FARWELL, a citizen of the United States of America, and resident of Sterling, in the county of Worcester and State of Massachusetts, have invented new and useful Improvements in Gauges for Molding Knives, of which the following is a specification.

This invention relates to a gauge for determining the contour of molding knives of the type adapted to be mounted on the peripheral faces of a polygonal rotary head with their cutting ends projecting tangentially, where the contour of the cutting edge must differ from the contour of the pattern or molding to be cut for the reason that the cutter is oblique to the molding while cutting and that the angle at which it does its cutting varies according to the knife projection or depth of cut.

The object of the present invention is to provide a simple and reliable gauge for quickly and accurately determining from a predetermined molding pattern the contour of a cutter (or gang of cutters) without calculations and without complex manipulations. A secondary object is to render the gauge readily adjustable to meet different conditions.

The knives of molding machines are held to the rotary cutter heads by bolts and it commonly happens that the distance from the axis of rotation of the head to the outermost point in these bolts or their associated nuts is greater than the distance to the corners of the cutter head itself. It is therefore common practice to set the knives with a certain minimum projection beyond the corners of the head so that they may cut a clearance for the bolts, and the cut made by a knife having this particular minimum projection is characterized as the surfacing cut, i. e., the cut which produces the surface which bounds the thickest portion of the molding. Thinner portions of the molding require deeper cuts and deeper cuts require increased knife projection.

According to the present invention the gauge has a pattern line and a plotting line spaced from the pattern line different degrees throughout the length thereof according to the differences between depths of cut and knife projections, so that successive points of the cutting edge outline may be plotted by shifting the gauge to successive points over the molding pattern. To facilitate the positioning of the gauge relatively to the pattern a guide line is provided oblique to the pattern line, the normals from the guide line to the plotting line representing distances of knife projection corresponding to cuts to points in the pattern line at the intersections of the normals with the pattern line. The gauge may also have a secondary or base line parallel to the guide line and spaced from the latter a distance equal to the minimum knife projection, i. e., the projection corresponding to the surfacing cut, the normals from the base line to the pattern line representing different depths of cuts below the surface plane and the corresponding normals to the plotting line representing the distances of knife projection for such cuts beyond the amount for the surfacing cut. The pattern line may also be in form of an edge and the guide line is preferably defined by a lateral shoulder or abutment on the gauge. The base line may be real or imaginary. At least one of the first two lines mentioned is curved, but one may be straight. By making the shoulder or abutment adjustable the position of the guide line may be changed relative to the other lines and the gauge thereby readily adjusted to different conditions such as increased minimum projection or different diameters of cutter heads.

For the purpose of illustration a preferred embodiment and a modification are shown in the accompanying drawings, in which:

Fig. 1 is a cross-sectional view of a cutter head showing one knife mounted thereon and showing the operative relationship between the cutter head, knife and stock to be cut;

Fig. 2 is a front elevation of one embodiment of the improved gauge in operative relationship with a pattern board;

Fig. 3 is a section on line 3—3 of Fig. 2;

Fig. 4 is a front elevation of a modified gauge; and

Fig. 5 is a section on line 5—5 of Fig. 4.

Referring to Fig. 1, 1 represents the cutter head rotatable about the axis 2, 3 a cutter blade clamped to the head by a bolt 4, and S the stock to be cut. Q represents the corner of the cutter head, and Q—N' the distance to which the blade 3 projects for the surfacing cut, which is represented by the horizontal plane including the point N. In order to cut into the stock below the surface plane to the different extents N—E, N—F, N—G, N—H, the blade 3 must project beyond the edge Q of the head, distances Q—E', Q—F', Q—G', Q—H' respectively, since the points of the cutting edge move along the arcs N'—N, etc., which are concentric with the axis of the cutter head. The distances Q—E', Q—F' etc. will be observed to be made up of the distance Q—N' plus, respectively, the distances N'—E', N'—F', etc. Inasmuch as the cutter 3 is oblique to the stock as it passes therethrough and since the points at different depths are cut by the blade when at different angles, the contour of the cutting edge must, as pointed out above, be different from the contour of the molding to be cut. For example, if the molding is to have the contour P (Fig. 2) the cutter should have a contour C for the particular arrangement shown in Fig. 1.

In the particular embodiment of the invention shown in Figs. 2 and 3 the gauge comprises a plate 5 having attached to one side thereof a shoulder or abutment 6 the upper surface of this abutment defining the guide line G. The aforesaid pattern line is in the form of an edge 8 of a slot 7 cut obliquely in the blade 5, the upper edge 9 of the slot constituting the aforesaid plotting edge. The edges 8 and 9 begin to diverge at a point 15 and through this point the so-called base line aforementioned extends parallel to the line B, although it need not be shown upon the gauge unless desired. This line is indicated at B in the illustrative embodiment to show its location. The normals from this line to the edge 8 represent depths of cut below the surfacing cut and corresponding normals from this line to the plotting edge 9 represent the amounts to be added to the minimum knife projection to effect cutting to the depths indicated by the points in the pattern line. It will be evident that normals extending from the guide line G to the plotting line 9 will constitute measures of the total knife projection requisite for cuts to depths corresponding to the points in the pattern line traversed by the normals.

The degree of obliquity of the slot 7 to the base line is optional and depends solely upon the length of scale desired. For example, if the maximum depth of cut below the surfacing cut is to be 2 inches the opposite ends of the line 8 are positioned respectively a distance equal to the minimum blade projection and 2 inches plus the minimum blade projection from the guide line G, and any desired distance apart along the guide line. The distances between the two edges 8 and 9 perpendicularly to the guide line may be determined empirically, by calculation, or graphically by a figure similar to Fig. 1.

One way of using this gauge is to draw the pattern (the contour to be cut) on a card or board such as 12 in Figs. 2 and 3, the minimum distance between the contour line P and the lower edge of the card or board being determined by the knife projection for the surfacing cut. By sliding the plate 12 along the scale with its lower edge bearing on the abutment 6 the contour C of the knife may readily be plotted by marking points on the plate 12 which fall under the edge 9 vertically opposite the points of intersection between the edge 8 and the pattern or contour curve P. For example, in the position of the parts shown in Fig. 2 the point 13 of the knife curve is determined by the fact it is vertically opposite the intersection point 14 of the edge 8 and curve P. In like manner other points of the curve C are determined, after which the contour C may be drawn on the board as a continuous line. This line C may then be used as a template in grinding the cutter knives.

Inasmuch as the minimum projection of the cutting edge beyond the cutter head will vary under different conditions, as for example when cutter heads of different diameters are used, and especially when thicker knives necessitate greater minimum overhang, it is sometimes desirable to make the corresponding distances between the guide line G and lower end 15 of slot 7 adjustable. Thus Figs. 4 and 5 show the abutment 6' mounted for adjustment relative to the slot 7' by means of screws 10 extending through slots 11 in a plate 5'.

As above stated at least one of the edges 8 and 9 will be curved and in the illustrated embodiments the edge 9 is curved while the edge 8 is straight, it being somewhat more convenient to first lay out the straight line 8 and then to determine the line 9 with relation to the line 8. As indicated in Fig. 2 the lines 8 and 9 are correspondingly calibrated at equal distances along the base line and the scale of line 8 may be marked at suitable intervals with the distances between the line and the base line.

From the foregoing it will be evident that one characteristic of the improved gauge consists in that the slot 7 tapers toward the base line.

The scales associated with lines 8 and 9 may be calibrated in terms of inches so that the device may also be used as a depth gauge.

It will be seen that I have provided a construction which satisfies the objects enumerated above and one which constitutes a valuable advance in the art. While I have shown the invention in certain physical embodiments it is to be understood that modifications of the structure shown may be made by those skilled in this art without departing from my invention as expressed in the following claims.

I claim:

1. A gauge for determining the contour of molding knives of the type adapted to be mounted on the faces of a rotary head with their cutting ends projecting tangentially, characterized by a pattern line and a plotting line spaced from said line different distances through the length thereof according to the differences between depths of cut and knife projection at different degrees of projection.

2. A gauge of the type referred to having a guide line, a pattern line oblique to said guide line, and a plotting line adjacent said pattern line, said lines being so arranged that the knife projection requisite for a depth corresponding to any point in the pattern line is measured by the distance to said plotting line from said guide line along a line perpendicular to the latter and passing through such point.

3. A gauge of the type referred to having a base line, adjacent pattern and plotting edges oblique to each other and to the base line, normals from the base line to the pattern edge representing different depths of molding pattern and corresponding normals to the plotting edge representing corresponding amounts of knife projection beyond a predetermined minimum.

4. A gauge of the type referred to having a guide line, and adjacent pattern and plotting edges oblique to said guide line and diverging from each other according to differences between degree of knife projection and depth of cut.

5. A gauge of the type referred to having a guide line, adjacent pattern and plotting edges oblique to said guide line and diverging from each other according to differences between degree of knife projection and depth of cut, one of said edges being straight and the other curved.

6. A gauge of the type referred to comprising a plate having a lateral abutment establishing a guide line, a pattern line oblique to the guide line, and a plotting line intersecting and diverging from said pattern line, normals from a line which is parallel to the guide line and passes through the intersection of said plotting and pattern lines to the pattern line representing different depths of cut and corresponding normals from the guide line to the plotting line representing corresponding degrees of knife projection.

7. A gauge of the type referred to comprising a plate having a lateral abutment establishing a guide line and an oblique slot tapering toward the guide line, the taper varying in accordance with progressive differences between knife projection and depth of cut.

8. A gauge for indicating the relation between the degree of knife projection and depth of cut when the cutting surfaces of the knife are operatively located at an acute angle to the surfaces of the cut, said gauge comprising a plurality of lines diverging from each other in accordance with the differences between the degree of knife projection and depth of cut made thereby.

Signed by me at Fitchburg, Massachusetts, this 10th day of January, 1925.

ALBERT W. FARWELL.